(12) United States Patent
Chinthekindi et al.

(10) Patent No.: US 10,649,807 B1
(45) Date of Patent: May 12, 2020

(54) METHOD TO CHECK FILE DATA INTEGRITY AND REPORT INCONSISTENCIES WITH BULK DATA MOVEMENT

(71) Applicant: EMC IP Holding Company LLC, Hopkinton, MA (US)

(72) Inventors: Ramprasad Chinthekindi, San Jose, CA (US); Abhinav Duggal, Milpitas, CA (US); Srikanth Srinivasan, Bangalore (IN); Lan Bai, Chelsea, MI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/169,891

(22) Filed: Oct. 24, 2018

(51) Int. Cl.
| | |
|---|---|
| *G06F 9/48* | (2006.01) |
| *H04L 9/06* | (2006.01) |
| *G06F 11/14* | (2006.01) |
| *G06F 21/64* | (2013.01) |
| *G06F 16/11* | (2019.01) |
| *G06F 16/185* | (2019.01) |
| *G06F 16/182* | (2019.01) |

(52) U.S. Cl.
CPC ........ *G06F 9/4875* (2013.01); *G06F 11/1441* (2013.01); *G06F 16/119* (2019.01); *G06F 16/185* (2019.01); *G06F 16/1827* (2019.01); *G06F 21/64* (2013.01); *H04L 9/0643* (2013.01)

(58) Field of Classification Search
CPC .. G06F 9/4875; G06F 16/1827; G06F 16/119; G06F 16/185; G06F 11/1441; G06F 21/64

See application file for complete search history.

(56) References Cited

U.S. PATENT DOCUMENTS

| | | | | |
|---|---|---|---|---|
| 6,606,715 | B1* | 8/2003 | Kikuchi | G06F 11/10 711/113 |
| 6,708,273 | B1* | 3/2004 | Ober | G06F 8/60 713/189 |
| 9,367,448 | B1* | 6/2016 | Botelho | G06F 12/0253 |
| 9,715,434 | B1* | 7/2017 | Xu | G06F 3/0608 |
| 10,019,323 | B1* | 7/2018 | Bai | G06F 11/1004 |
| 2005/0081094 | A1* | 4/2005 | Kadkade | G06F 11/3604 714/12 |
| 2009/0307660 | A1* | 12/2009 | Srinivasan | G06F 8/314 717/114 |

* cited by examiner

*Primary Examiner* — Guy J Lamarre
(74) *Attorney, Agent, or Firm* — Womble Bond Dickinson (US) LLP

(57) ABSTRACT

In an embodiment, a method for validating data integrity of a seeding process is described. The seeding process for migrating data from a source tier to a target tier persists a perfect hash vector (PHV) to a disk when the seeding process is suspended for various reasons. The PHV includes bits for fingerprints for data segments corresponding to the data, and can be reloaded into memory upon resumption of the seeding process. One or more bits corresponding to fingerprints for copied data segments are reset prior to starting the copy phase in the resumed run. A checksum of the PHV is calculated after the seeding process completes copying data segments in the containers. A non-zero checksum of the PHV indicates that one or more data segments are missing on the source tier or the data segments are not successfully copied to the target tier. The missing data segments and/or one or more related files are reported to a user via a user interface.

20 Claims, 11 Drawing Sheets

US 10,649,807 B1

METHOD TO CHECK FILE DATA INTEGRITY AND REPORT INCONSISTENCIES WITH BULK DATA MOVEMENT

FIELD OF THE INVENTION

Embodiments of the present invention relate generally to data storage systems. More particularly, embodiments of the invention relate to systems and method for checking file data integrity and reporting inconsistencies with data migration from one tier to another.

BACKGROUND

In a deduplicated file system, such as Data Domain™ file system from EMC® Corporation, files can be moved from a source tier to a target tier (e.g., from an active tier to a cloud tier) for long term retention based on file system policies.

Typically, files can be moved from a source tier to a target tier using a file-based data movement or a physical or bulk data movement (i.e., Seeding). The file-based data movement requires logically enumerating each file's segment tree to filter out segments already existing on a target tier. Since this involves random I/O operations, it can be very inefficient when the target tier is empty or when migrating generation-zero data. The seeding method performs sequential I/O operations by physically moving containers that are associated with files to be migrated in a sequential order, and is generally more efficient than the file-based data movement.

In the seeding method of data-movement, data segments belonging to all files selected for migration are transferred collectively, and can rely on bits in a data structure (e.g., perfect hash vector) to detect data inconsistency. However, if the data movement was suspended due to preemption by a garbage collector or a system crash, information of bits reset in memory would be lost. Therefore, there is a need for an alternative way of validating data consistency in the above scenario.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
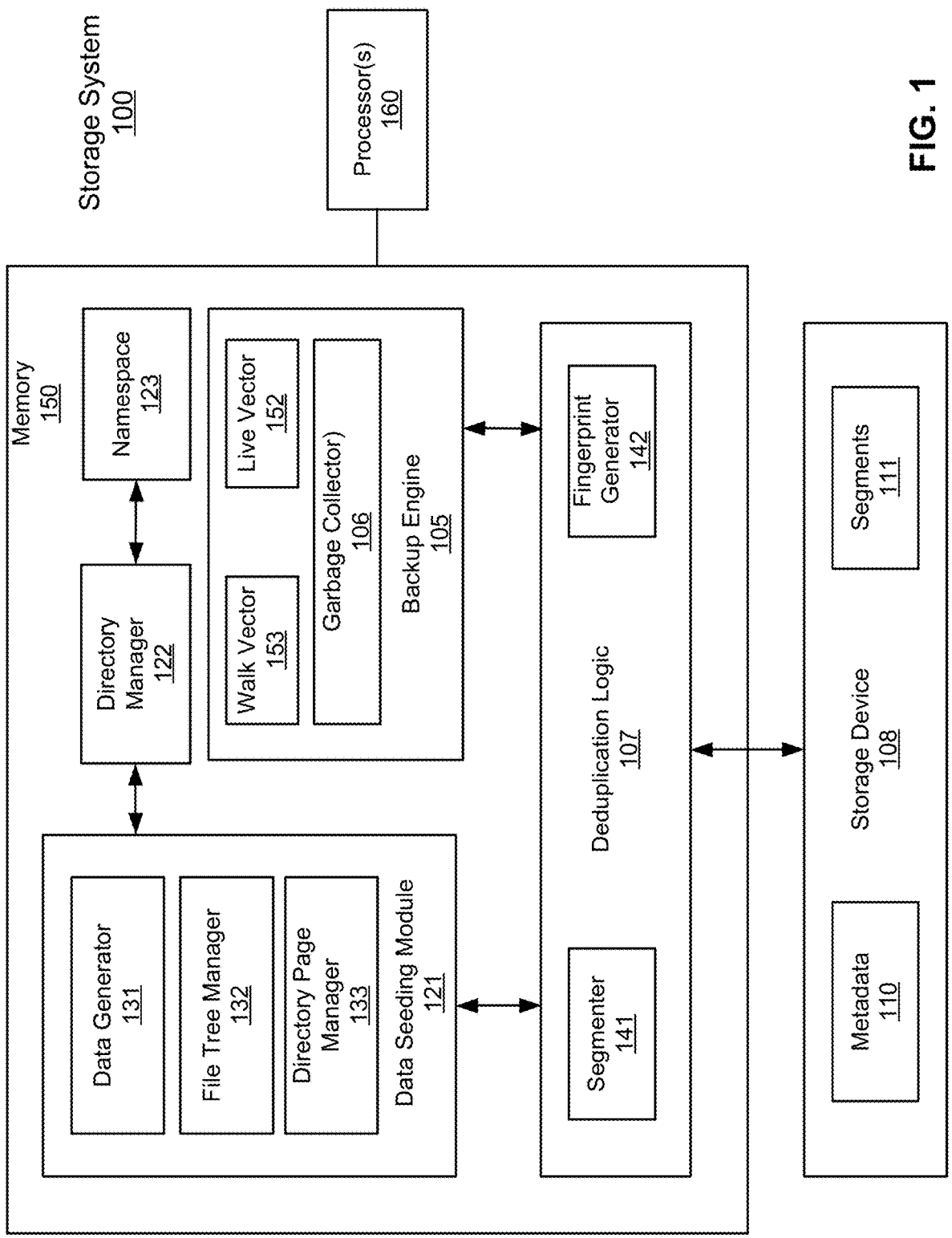
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In an embodiment, a system and method for supporting a seeding process with suspend and resume capabilities are described. A resumable seeding component in a data seeding module can be used to move data (e.g., one or more files) from a source tier to a target tier. A resumption context including a perfect hash function (PHF) and a perfect hash vector (PHV) persists a state of a seeding process at the end of each operation in the seeding process. The PHV represents data segments of the data using the PHF. The resumption context is loaded into memory upon resumption of the seeding process after it is suspended either manually or due to a system crash or shutdown. Information in the resumption context is used to determine a last successfully completed operation, and a last copied container. The seeding process is resumed by executing an operation following the completed operation in the resumption context.

In an embodiment, after the resumption of the seeding process after it is suspended, the resumable seeding component can load the PHV into memory, and walk containers corresponding to the files selected for migration, to determine data segments that have been copied to the target tier in a previous run of the seeding process.

For each of the data segments that has been copied to the cloud tier, the resumable seeding component can reset a bit corresponding to a fingerprint for data segment in the PHV vector prior to starting the copy phase in the resumed run of the seeding process. At the end of the copy phase of the resumed run, the resumable data component can determine whether a checksum of the PHV not zero.

In an embodiment, a non-zero checksum of the PHV indicates that a data segment that is missing on the source tier is populated in the vector, or that a data segment that is present on the source tier and populated in the vector is not copied to the target tier. Any data segment that is missing either on the source tier or the target tier can be reported to a user via a user interface. In an embodiment, a file associated with a missing segment can also be identified and reported to the user.

Storage System

FIG. 1 is a block diagram illustrating a storage system according to one embodiment of the invention. Referring to FIG. 1, storage system 100 may represent any type of server or a cluster of one or more servers (e.g., cloud servers) to allow a variety of clients to access the data stored therein over a network (not shown). A client may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, a client may be a primary storage system (e.g., local data center) that provides storage to other local clients, which may periodically back up the content stored therein to a backup storage system (e.g., a disaster recovery site or system), such as storage system 100. The network may be any type of networks such as a local area network (LAN), a wide area network (WAN) such as the Internet, a fiber network, a storage network, or a combination thereof, wired or wireless.

For example, storage system 100 may be a storage server used for various different purposes, such as to provide multiple users or client systems with access to shared data and/or to back up (or restore) data (e.g., mission critical data). Storage system 100 may provide storage services to clients or users via a variety of access interfaces and/or protocols such as file-based access protocols and block-based access protocols. The file-based access protocols may include the network file system (NFS) protocol, common Internet file system (CIFS) protocol, etc. The block-based access protocols may include the small computer system interface (SCSI) protocols, Internet SCSI or iSCSI, and Fiber channel (FC) protocol, etc.

In one embodiment, storage system 100 includes, but is not limited to, storage software or storage service engine 106 (e.g., garbage collection logic, etc.) and deduplication logic 107 executed in memory 150 by one or more processors 160, and one or more storage units or devices 108 (e.g., persistent storage device such as hard disks) communicatively coupled to each other. Storage service engine 106 may represent any storage service related components configured or adapted to provide storage services (e.g., storage as a service) to a variety of clients using any of the access protocols set forth above. For example, storage service engine 106 may include backup logic and restore logic. The backup logic is configured to receive and back up data from a client and to store the backup data in storage device 108. The restore logic is configured to retrieve and restore backup data from storage device 108 back to a client.

Storage device 108 may be implemented locally (e.g., single node operating environment) or remotely (e.g., multi-node operating environment) via interconnect, which may be a bus and/or a network (e.g., a storage network). Storage device 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Storage device 108 may be located locally or remotely accessible over a network.

In response to a data file to be stored in storage device 108 (e.g., from a storage file system), according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner in storage device 108 as part of segments 111. The metadata, such as metadata 110, may also be stored in storage device 108, such that files can be accessed independent of another storage device. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over the input data, breaking the data stream into smaller variable length units called segments through a process called anchoring and by processing digest information associated with each segment through a process called fingerprinting and mapping the identical segments to a single instance of the data segment. In such systems, an index table of unique digests is created to find commonality among the data set. When a deduplicated data segment is updated with a new content, a new data segment is created containing the new updated content. Mapping of the deduplicatedsegment is then changed to point to the new data segment and the deduplicatedsegment no longer points to the single copy of the data.

In other implementation of deduplication (as compared to variable length segment based deduplication described above) data deduplication can operate at a file or a block level. File deduplication eliminates duplicate files (as in the example above), while block deduplication processes blocks within a file and saves unique copy of each block. As compared to file and block based deduplication, a variable length segment based deduplication offers the most deduplication efficiency as the deduplication algorithm is immune to shifts in data stream. For example, if only a few bytes of a document or presentation or a file are changed, only the changed segments are saved. The changes made to few bytes of the document or the presentation or the file do not constitute an entirely new file. The sharing of file system data segments conserves data storage for storing files in a data storage system. The snapshot copy facility is a space saving technology that enables sharing of file system data blocks among versions of a file. On the other hand, a deduplication facility enables the sharing of file system data segments within a file, among versions of a file, between versions of a file and unrelated files, and among unrelated files. Therefore, the deduplication facility eliminates from the data storage system any file system data segments containing duplicative data content.

According to one embodiment, system 100 includes a data seeding module 121 executed in memory 150 and communicatively coupled to directory manager 122 and deduplication logic 107. Data seeding module 121 is configured to seed a set of files with a specific file size distribution, in a particular directory configuration, and with a particular locality. The set of files may be stored in storage device 108 as part of segments 111 and metadata 110. Directory manager 122 and namespace 123 may be implemented as part of a file system.

In one embodiment, data seeding module 121 includes data generator 131, file tree manager 132, and directory page manager 133. When a request for seeding a set of files having certain characteristics (e.g., a predefined compression ratio, a number of files, an average file size, and/or a target locality) is received, for example, via a user interface or an application programming interface (API), data generator 131 is configured to generate a set of data with optional predefined compression ratio. Data generator 131 then invokes segmenter 141 of deduplication logic 107 to segment the data set into data segments and invokes fingerprint generator 142 of deduplication logic 107 to generate a fingerprint (e.g., metadata) for each of the data segments. Data generator 131 generates from the data set enough data segments with their respective fingerprints to satisfy the predefined number of files and the predefined file size as specified in the request.

Once the data segments and their metadata have been generated, according to one embodiment, file tree manager 132 generator a file tree using the fingerprints of the segments for each of the files, where each file tree represents one of the files to be seeded. Each file tree includes one or more levels of nodes or segments in a hierarchical structure. Each file tree includes a root node representing a content handle of the file, one or more levels of intermediate nodes directly or indirectly referenced by the root node, and multiple leaf nodes that represent the actual data segments directly or indirectly referenced by one or more intermediate nodes. A parent node includes a fingerprint of content of each child node or child nodes it references. Thus, only the leaf node contains the actual data segment, while any other nodes, either being a root node or intermediate node, contain fingerprints of its respective child nodes.

Once the file trees have been generated, in one embodiment, directory page manager 133 is configured to populate one or more directory pages (also referred to as directory manager pages or DM pages) by accumulating enough content handles of the file trees (e.g., root nodes of the file trees). Each directory page contains content handles of file trees based on the specific directory page size that is compatible with a particular file system of system 100. The number of file trees represented in each directory page and the number of directory pages required are also determined based on the specific directory configuration that is derived from the request, such as, for example, a number of files in the same directory and the locality of the directory, etc. Once the directory pages have been configured and the content handles have been accumulated, directory page manager 133 communicates with directory manager 122, for example, via an API, to request directory manager 122 to create namespace 123 representing the directory pages that have been configured. Directory page managers 133 provides the accumulated content handle of file trees to directory manager 122, as well as other directory parameters (e.g., directory names, directory locations, etc.) to allow directory manager to create the corresponding directories, i.e., namespace 123.

According to one embodiment, directory manager 122 returns, for example, via the API, the namespace information describing namespace 123 to directory page manager 133. The namespace information and the actual data segments are then written, for example, as one or more batches) to storage device 108 as part of metadata 110 and segments 111. The namespace information and the actual data segments are stored in a manner (e.g., timing and/or storage locations) that satisfies the requested or target locality, which may be specified in the request for seeding data. Since the files and their respective metadata are written in batches or an accumulated fashion to satisfy the required locality, the number of individual IO transactions to storage device 108, as well as any unnecessary file system processes, can be greatly reduced. As a result, the efficiency of the data seeding operations can be greatly improved.

Note that for the purpose of seeding data, deduplication logic 107 is optional. Segmenter 141 and fingerprint generator 142 may be integrated with data seeding module 121 or data generator 131. Alternatively segmenter 141 and fingerprint generator 142 can be separate modules that are communicative coupled to data seeding module 121 via an API. Furthermore, data seeding module 121 may also be integrated as part of a file system having directory manager 122 therein, where data seeding module 121 can be accessed via a user interface by a user or it can be invoked via an API maintained by the file system.

Note that some or all of the components as shown and described above (e.g., data seeding module 121, deduplication logic 107) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
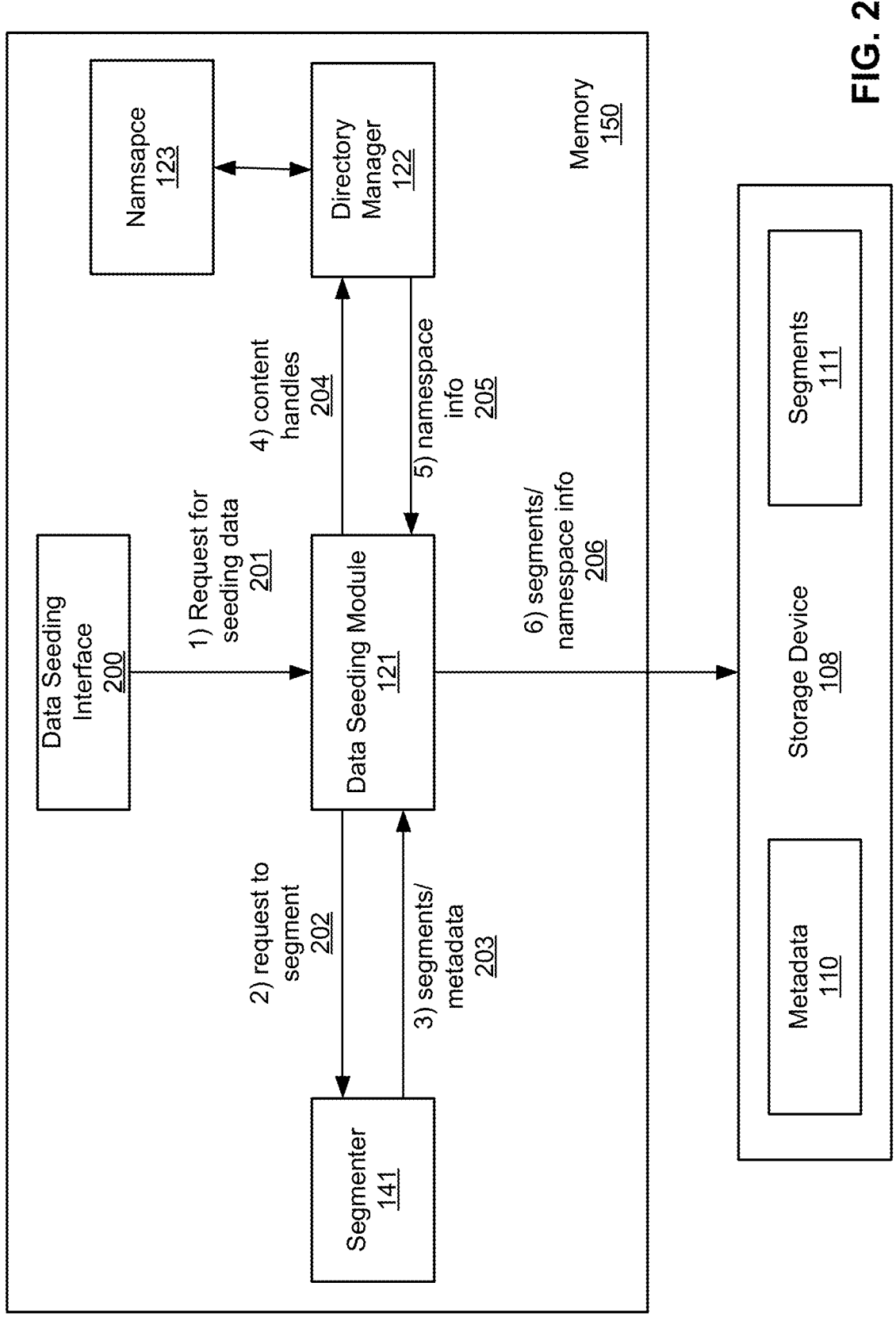
FIG. 2 is a transaction diagram illustrating a process of seeding files with a particular locality according to one embodiment of the invention.

FIG. 2 is a transaction diagram illustrating a process of seeding files with a particular locality according to one embodiment of the invention. The system as shown in FIG. 2 may be implemented as part of the system as shown in FIG. 1. Referring to FIG. 2, in one embodiment, data seeding module 121 receives a request from data seeding interface 200 for seeding data via path 201. The interface 200 may be a user interface through which a user can initiate a process of seeding files or alternatively, interface 200 may be an API to receive the request from another application or a remote device over a network. The request may include information specifying a number of files to be seeded, an average file size, a target compression ratio of the files, and/or a target locality of the files, etc.

In response to the request, data seeding module 121 (e.g., data generator 131) 0generate a data set, such as a large piece of artificial data, in memory. In one embodiment, the data set is created with a certain data pattern to satisfy the target data compression ratio that is specified in the request. In one embodiment, a predetermined algorithm that is specifically configured for generating data with the target compression is utilized. In another embodiment, a third party tool or function may be invoked to generate such data set with a particular data compression ratio. Typical compression algorithms look for common patterns of data in the set that is getting compressed and only store one pattern eliminating the redundant copy. For example, if one wants to generate 2x compressibility (e.g., data reduces to half after compression), it generates half the data randomly and add zeroes to the rest of the data set. The zeroes will get compressed completely thereby providing 2x compression.

Once the data set with the target compression has been created, data seeding module 121 provides the data set to deduplication logic 107 via path 202 to allow deduplication logic 107 to segment the data set into data segments using a predetermined segmenting or chunking algorithm. In addition, deduplication logic 107 generates the fingerprints of the data segments, for example, by hashing content of the data segments using a predetermined hash algorithm. Data seeding module 121 receives the data segments and their fingerprints from deduplication logic 107 via path 203. In response to the data segments and their fingerprints, data seeding module 121 constructs a file tree for each of the files to be seeded, where the number of the files to be seeded may be specified in the request received from interface 200 via path 201.

As described above, a file tree may include multiple levels of nodes in a hierarchical structure, where a parent node contains the metadata or fingerprints of its child node or nodes. Thus, only the leaf nodes represent the actual data segments. A root node represents a content handle of the corresponding file. In one embodiment, a file tree can be represented by a Merkle tree. A Merkle tree is a tree in which every non-leaf node is labelled with the hash of the labels of its children nodes. Hash trees are useful because they allow efficient and secure verification of the contents of large data structures. Hash trees are a generalization of hash lists and hash chains.

Figure 3:
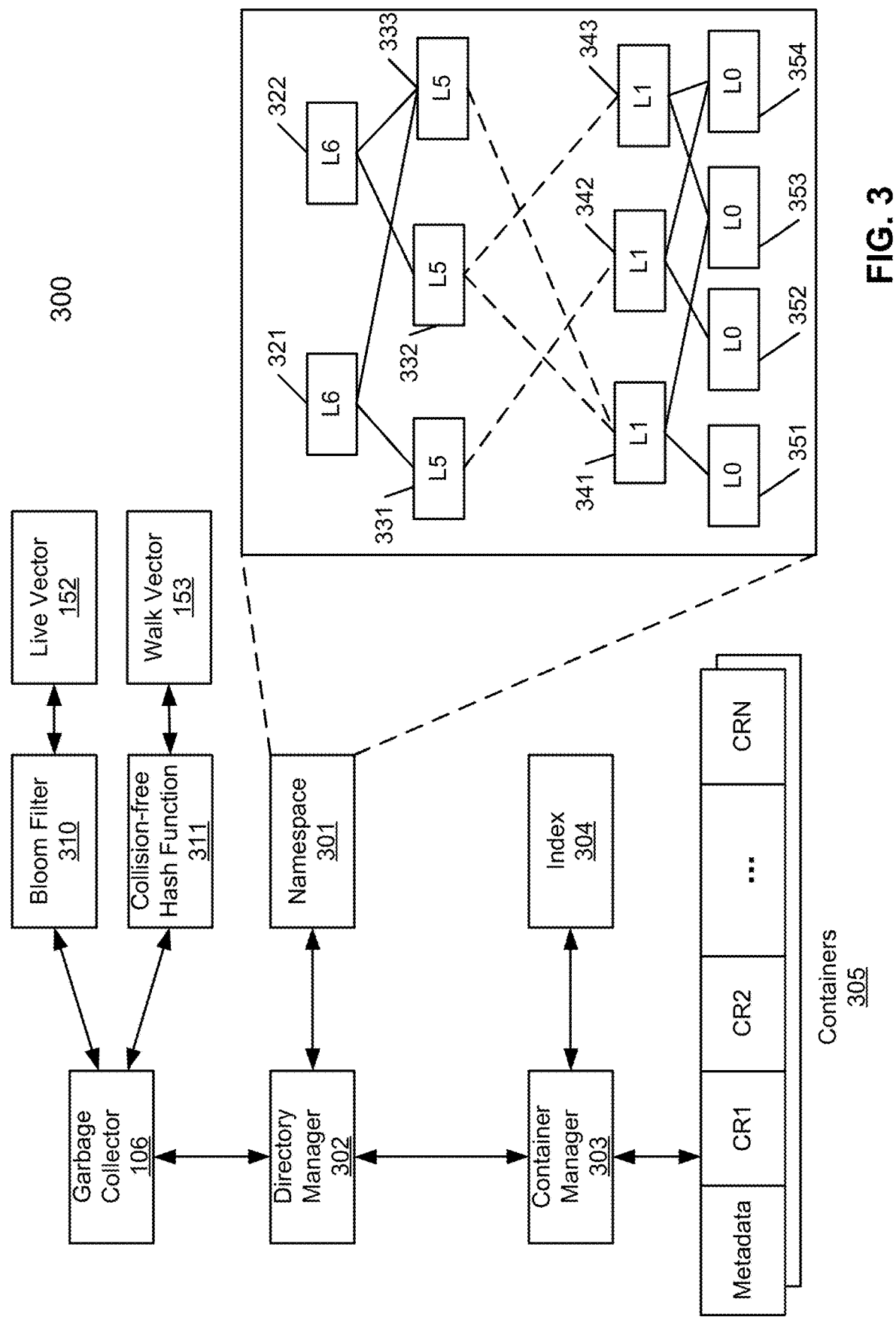
FIG. 3 is a block diagram illustrating a storage system according to one embodiment of the invention.

FIG. 3 is a block diagram illustrating a storage system according to one embodiment of the invention. System 300 may be implemented as part of storage system 100 of FIG. 1. Referring to FIG. 3, garbage collector 106 traverses namespace 301 via directory manager 302, where directory manager 302 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as Lp segments.

In one embodiment, when garbage collector 106 traverses namespace 301 via directory manager 302, it obtains the fingerprints of the root level segments, in this example, L6 segments, as part of content handles from namespace 301. Based on the fingerprints of the current level segments, container manager 303 can identify which of the containers 305 in which the segments are stored based on indexing information from index 304. Index 304 may be maintained in the system memory (e.g., volatile memory) and/or in a storage device (e.g., non-volatile memory). Index 304 includes information mapping a fingerprint to a storage location that stores a segment represented by the fingerprint. In one embodiment, index 304 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 3, in one embodiment, there are two components responsible to manage the files in the system. The first one is directory manager 302, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 305 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 303 is responsible to maintain the log-structured container set and provide a mapping from container identifiers (CID) to block offset on disk. This mapping may be maintained in memory. It also contains additional information, e.g., the content type of each container.

In the example as shown in FIG. 3, segment 321 includes a fingerprint of fingerprints of segments 331 and 333, and segment 322 includes a representation (e.g., a fingerprint) of fingerprints of segments 232-233, and so on. Some of the segments, such as segment 333, are referenced shared by multiple parent level segments (e.g., segments 321-322). Thus, segments 321-322, 331-333, and 341-343 only contain data representing the metadata of their respective child segments. Only segments 351-354 contain the actual user data.

A conventional garbage collection process typical traverses the segments in a depth-first or a file-by-file manner. For example, assuming segment 321 is associated with a first file while segment 322 is associated with a second file, the garbage collector will have to traverses a first file by scanning segment 321 and then segments 331 and 333, and so on. After the first file has been processed, the garbage collector will process the second file by scanning segment 322 and then segments 332-333, and so on. Thus, segment 333 will be processed at least twice in this example. If there are more files stored in the storage system, there are more segments that will be shared or referenced by multiple files and the processing of the same segments will be repeatedly performed. Thus, the time to perform the garbage collection depends on the size of namespace 301, which depends on the fragmentation of the metadata on disk. The more fragmented the metadata is the more costly it is to read segments from the file from disk.

According to one embodiment, instead of traversing namespace 301 based on a file-by-file basis or a depth-first manner, garbage collector 106 traverses the physical segments in a breadth-first or level-by-level basis. Garbage collector 106 starts with the root level, in this example, L6 segments 321-322. For each of the segments found in namespace 301, regardless which file or files the segment is associated with, live vector 152 is updated or marked to indicate that the corresponding segment is alive. For each of the segments that have been processed, walk vector 153 is updated or marked to indicate that the corresponding segment has been processed so that no repeated process for the same segment will be performed. Once all of the segments of a current level have been processed, segments of a next child level are processed and live vector 152 and walk vector 153 are updated accordingly.

Live vector 152 includes multiple bits, each corresponding to one of the live segments found in namespace 301. Similarly, walk vector 153 includes multiple bits, each corresponding to one of the segments in namespace 301. According to one embodiment, when a live segment is found, the fingerprint or metadata of the live segment is applied to bloom filter 310 which yields one or more of the bits in live vector 152 to be set to a predetermined logical value (e.g., logical value one or zero). A bloom filter is a space-efficient probabilistic data structure that is used to test whether an element is a member of a set. False positive retrieval results are possible, but false negatives are not; i.e. a query returns either "inside set (may be wrong)" or "definitely not in set". Elements can be added to the set, but not removed (though this can be addressed with a counting filter). The more elements that are added to the set, the larger the probability of false positives.

According to one embodiment, when a segment has been processed or traversed, the fingerprint or metadata of the segment is applied to collision-free hash function 311 which yields one of the bits in walk vector 153 to be set to a predetermined logical value (e.g., logical value one or zero). In one embodiment, collision-free hash function 211 is a perfect hash function. A perfect hash function for a set S is a hash function that maps distinct elements in S to a set of integers, with no collisions. A perfect hash function has many of the same applications as other hash functions, but with the advantage that no collision resolution has to be implemented.

In one embodiment, collision-free hash function 311 is generated based on the fingerprints of the segments (e.g., a set of fingerprints) stored in the storage system prior to performing the traversal of the namespace 301. That is, prior to performing any garbage collection, a processing logic such as garbage collector 106 scans all fingerprints of the segments that are involved in the garbage collection to generate a collision-free hash function for those involved segments. If the garbage collection is performed based on a subset of segments (e.g., a range of fingerprints), for each subset, a corresponding collision-free hash function may be specifically generated based on the fingerprints of the segments involved in that particular subset.

According to one embodiment, processing logic such as garbage collector 106 walks through, via directory manager 302, the root level or the most parent level segments, in this example, the L6 segments 321-322 and all the L6 references to walk vector 153 as well as to live vector 152. The root segments 321-322 may be identified based on their content handles, which may be maintained by namespace 301 or the content store (not shown). Based on the content handles, the references (e.g., fingerprints) associated with segments 321-322 may be obtained. Thereafter, the processing logic performs a level-by-level scan of a set of containers that are involved in the garbage collection, which may be a subset of containers or all containers. During the scan for a given level $L_i$ ($1 \le i \le$ number of levels, in this example, 6), only containers that contain segments of the $L_i$ level are considered. Once a container having $L_i$ segments is found, processing logic reads content (e.g., metadata and/or data portion) of the container or compression regions containing the $L_i$ segments, checks the walk vector 153 of all the $L_i$ segments and if any is found, adds its references or $L_{i-1}$ segments to the walk vector 153 as well as to the live vector 152. The processing logic scans the $L_{i-1}$ level only if the $L_i$ level has been fully processed. In this example, referring back to FIG. 2, the processing logic will scan segments 321-322 and populates live vector 152 and walk vector 153, before scanning their next child level segments 331-333, and so on.

Resumable Data Migration

Organizations often need to migrate files and data from a frequently accessed tier (active tier) to an infrequently access. For example, old mail messages need to be migrated to a cloud tier for long-term retention or to meet regulatory and compliance policies.

Existing solutions for data migration include using a seeding process, which can include a number of phases represented by sequential operations. In a merge phase, an in-memory fingerprint index is persisted to a disk. In an analysis phase, perfect hash functions (PHFs) are built to map a fingerprint of a data segment to a unique bit position in an in-memory bit vector, known as perfect hash vector (PHV). Compact hash tables are used to represent keys in the vector without a collision. In an enumeration phase, a namespace is enumerated to identify files selected for migration based on policies; and a set of containers are walked to identify data segments belonging to those files and to populate the PHV with the data segments. In a select phase, containers, which include data segments referenced by the files, are selected. In a copy phase, the selected containers are iterated and live data segments are copied to a target tier (e.g., a cloud tier) in batches. In an install phase, the namespace is walked again, and locations of the selected files are updated to point to the target tier.

The existing seeding process can take a long time, for example, weeks; and may have to be stopped temporarily suspended for a number of reasons. For example, a garbage collector may need to run on the source tier active tier: if the garbage collector is disabled on source tier until the seeding process completes, the storage system may run out of space. The seeding process may also be stopped if the cloud tier is disconnected while the seeding process is ongoing. Further, the seeding process may be impacted if the system or DDFS process is crashed. Furthermore, a user may want to stop the seeding process temporarily to relieve the system load and restart later.

If the seeding process stopped or suspended, the whole data movement has to start all over again. Considering the seeding process may take days or weeks, the existing seeding process is inefficient and may waste substantial times and resources when it is suspended or stopped for the reasons described above.

Figure 4:
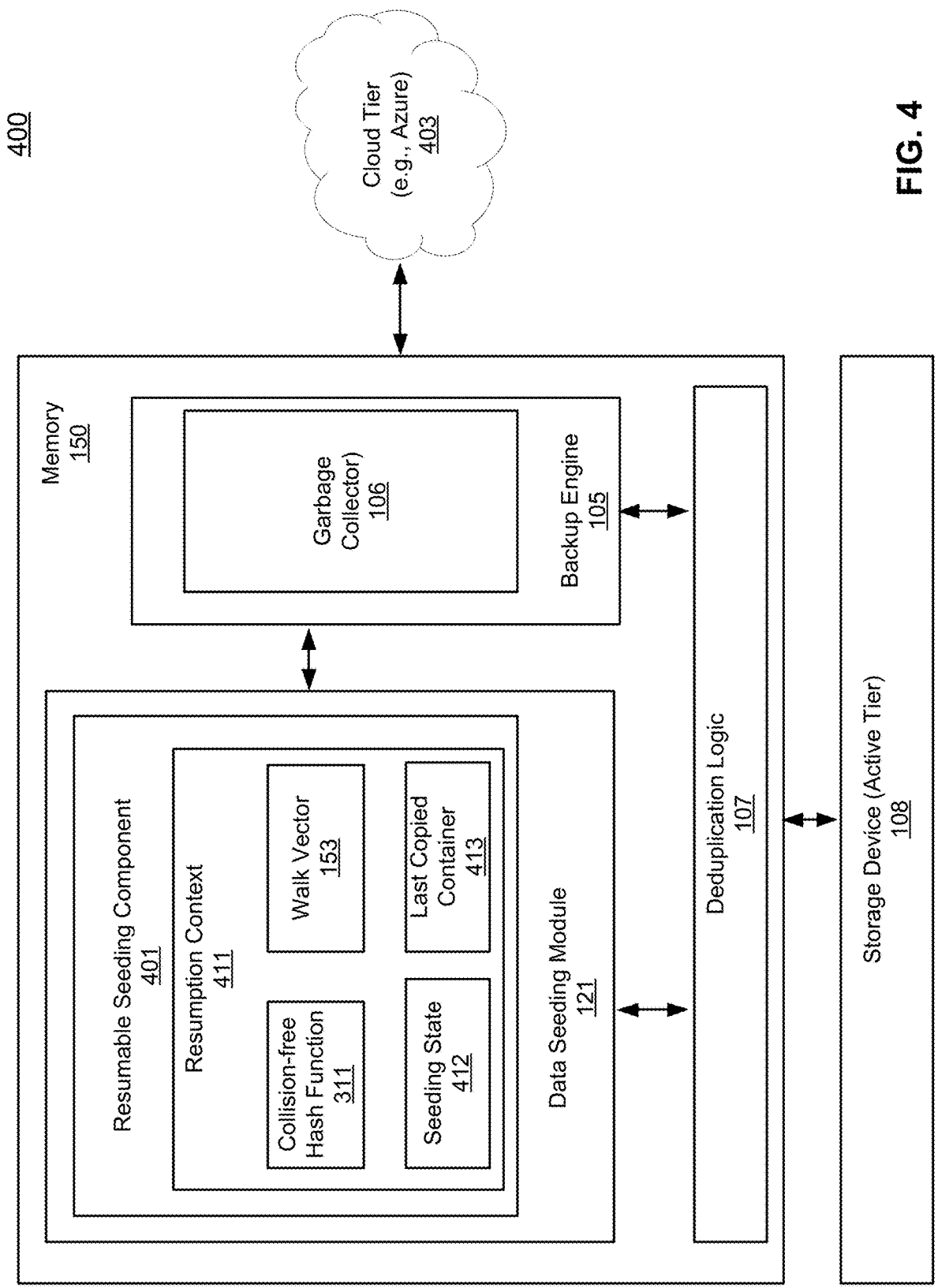
FIG. 4 illustrates a system for efficient data migration from a source tier to a target tier, in accordance with an embodiment.

FIG. 4 illustrates a system for efficient data migration from a source tier to a target tier, in accordance with an embodiment.

As shown in FIG. 4, system 400 includes a resumable seeding component 401 in the data seeding module 121. The resumable seeding component 401 further includes the collision-free hash function 311, the walker vector 153, and a resumption context 411.

When a request is received at the data seeding module 121 for migrating data from an active tier on the storage device 108 to a cloud tier 403, the resumable seeding component 401 can start the enumeration phase, wherein the resumable seeding component 401 can select files for migration based on a policy. For example, the policy can specify that all files older than 2 months need to be migrated from the active tier 108 to the cloud tier 403. If a file is eligible for migration based on the policy, the resumable seeding component 401 can set a flag in a file attribute. If the file has been modified, this flag is cleared.

At the end of the enumeration phase, a set of containers belonging to the selected files can be identified and data segments in the containers are populated to the walk vector 153 through the collision free hash function 311. The walker vector 153 and the collision free hash function 311 can be persisted to a disk. The walk vector 153 can be a perfect hash vector and the collision free hash function 311 can be perfect hash function. There can be more than one walker vector 153 and more than one collision free hash function 311 for the files selected for migration.

At the end of the select phase, identifiers (Ids) for the set of containers are persisted in a file on disk. At the end of each phase of the seeding process (i.e., the merge phase, the analysis phase, the enumeration phase, the select phase, the copy phase, and the install phase), a state 412 for that phase is persisted to the resumption context 411.

During the copy phase, the set of containers corresponding to the files for migration are copied in batches starting from the highest container-id moving back to the lowest container id. At the end of each batch, the identifier of the last copied container is persisted to the resumption context. In an embodiment, copying a container means copying one or more data segments in that container; the actual container itself is not copied.

The resumption context 411 can include a number of name-value pairs, each name-value pair representing a state of a completed phase of the seeding process or an identifier of the last copied container for each of the batches.

During the install phase, locations of the files are updated to point to the cloud tier 403, and the flag for each file that is set during the enumeration phase is cleared.

If the seeding process is suspended for any reason, the resumable seeding component 401 can resume the seeding process from where it was suspended to execute an operation following the last successful operation stored in the resumption context. The resumable seeding component 401 can read into the memory 150 the file including containers Ids of the containers corresponding to the files selected for migration, and can flag the containers Ids for migration. The PHF and PHV are also loaded into the memory 150.

In an embodiment, the walker vector 153, the collision free hash function 311, the seeding state 412, and the last copied container can all be part of the resumption context 411, and can be persisted and loaded into memory with the resumption context 411.

Figure 5:
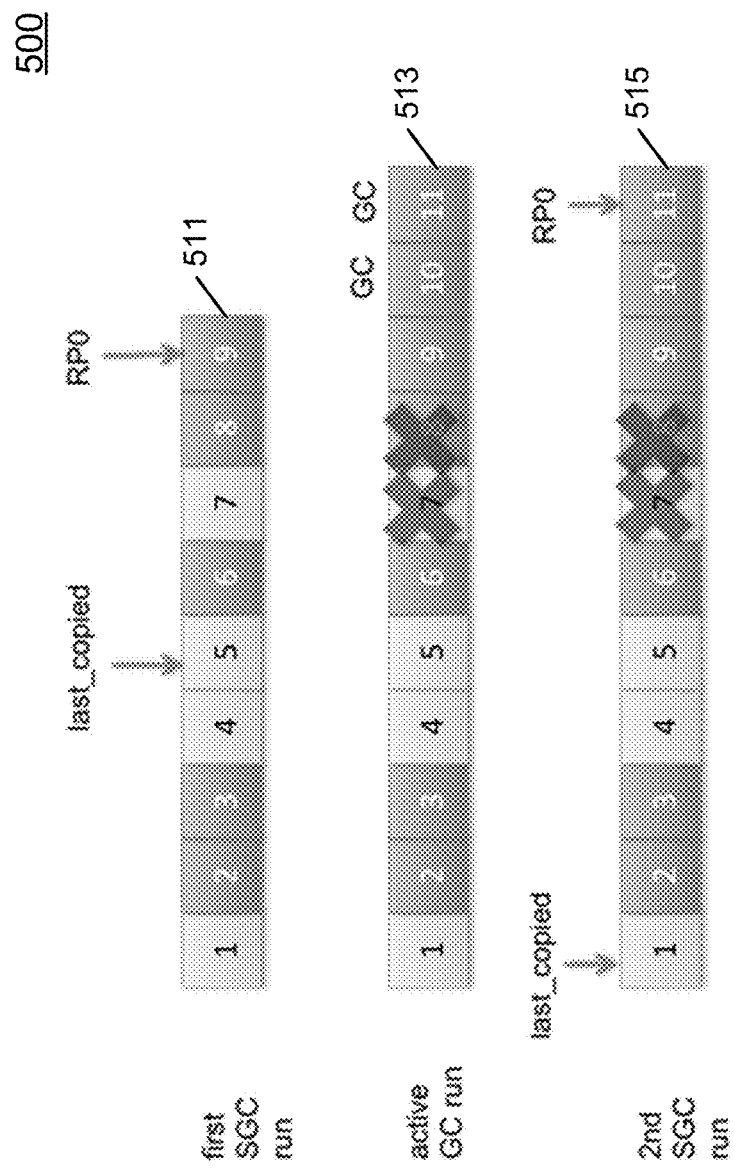
FIG. 5 illustrates an example of efficient data migration from a source tier to a target tier, in accordance with an embodiment.

FIG. 5 illustrates an example of efficient data migration from a source tier to a target tier, in accordance with an embodiment.

More specifically, the example in FIG. 5 shows the resumption of a seeding process after a garbage collector running on an active tier has caused the seeding process to pause or stop.

In FIG. 5, blocks labeled with numbers are containers on an active tier. In the first seeding run 511, the seeding process selects containers 1, 4, 5, and 7 for migration in one of the batches, and copies containers 7 and 5 from the active tier to a cloud tier before the seeding process is interrupted by the garbage collector running on the active tier. Since the seeding process is suspended after container 5 has been copied, container 5 is the last copied container and is persisted to a resumption context for the batch.

When the garbage collector runs 513, the garbage collector is not to delete containers selected for migration and labeled with numbers below the number corresponding to the last copied container. In this figure, the garbage collector can delete containers 2 and 3, and containers 6, 7, 8 and 9. However, the garbage collector cannot delete containers 1 and 4, since these two containers have been selected for migration and they are labeled with a number below the last copied container. For example, the garbage collector deletes containers 7 and 8, and copies their live segments to garbage collector containers 10 and 11.

When the seeding process resumes 515, a data seeding module can load the resumption context, which can include PHFs, PHVs, and a seeding state; and can start copying from container 4 upon resumption at the copy phase. After the resumed run of the seeding process copies containers 4 and 1, the data seeding module can update the last copied container from container 5 to container 1. If the seeding process is again suspended, the next seeding run will only need to run the install phase.

Figure 6:
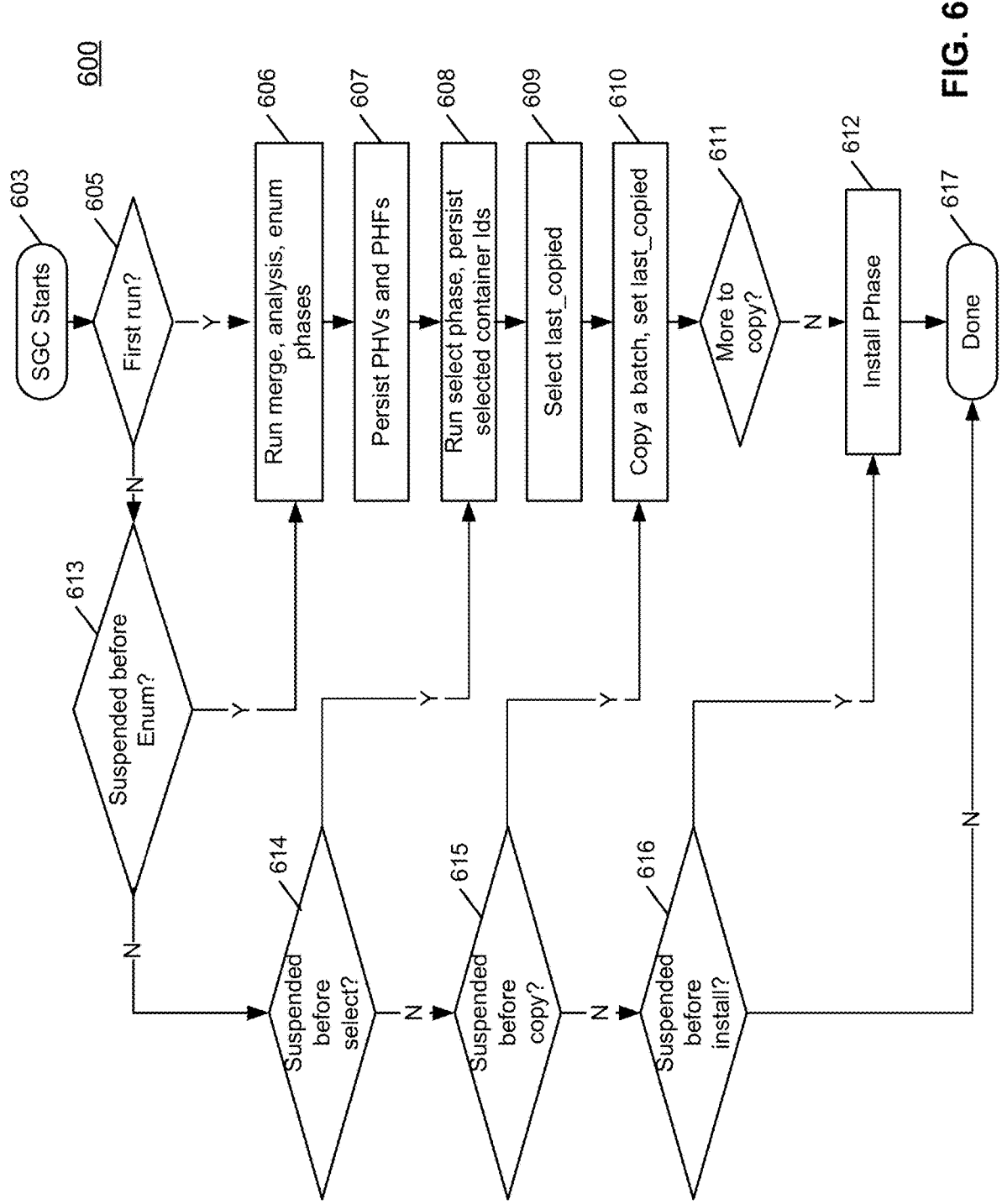
FIG. 6 is a flow diagram illustrating a process of data migration from an active tier to a cloud tier, in accordance with an embodiment.

FIG. 6 is a flow diagram illustrating a process of data migration from an active tier to a cloud tier, in accordance with an embodiment.

As shown in FIG. 6, a seeding process can start 603 its first run 605 from a merge phase through an enumeration phase 606, and can persist one or more PHFs, one or more PHVs 607 in a resumption context. The seeding process select files at the end of enumeration phase, and persists the state that the seeding has completed the enumeration phase. A select phase 608 can run to select containers for migration. At the end of the select phase, the Ids of the selected containers and a container Id 609 from where the copy phase starts (last copied container) are persisted to the resumption context. In an embodiment, the last copied container can be where the copying stops in a previous run and where the copying starts in a resumed run if data segments in the last copied containers have not completely copied in the previous run. The state of the seeding process is updated to indicate that the seeding process has completed the select phase is updated. A copy phase can run 610 to copy data segments in the selected containers in batches. At the end of each batch copy, the Id of the last copied container is persisted. If the seeding process is suspended, the next resume cycle will start copying from the last copied container Id.

If no data segments are to be copied from the containers 611, the seeding process proceeds to the end of the copy phase, at which point the state of the seeding process is updated to indicate that the copy has been completed. The install phase 512 can run next to update locations of the files to point to the cloud tier/destination tier.

At any point, if the seeding process is suspended 613, 614, 615, and 616, the previous completion state is checked upon resumption of the seeding process, and the seeding process begins from a phase following a phase with the completion state stored in the resumption context.

Figure 7:
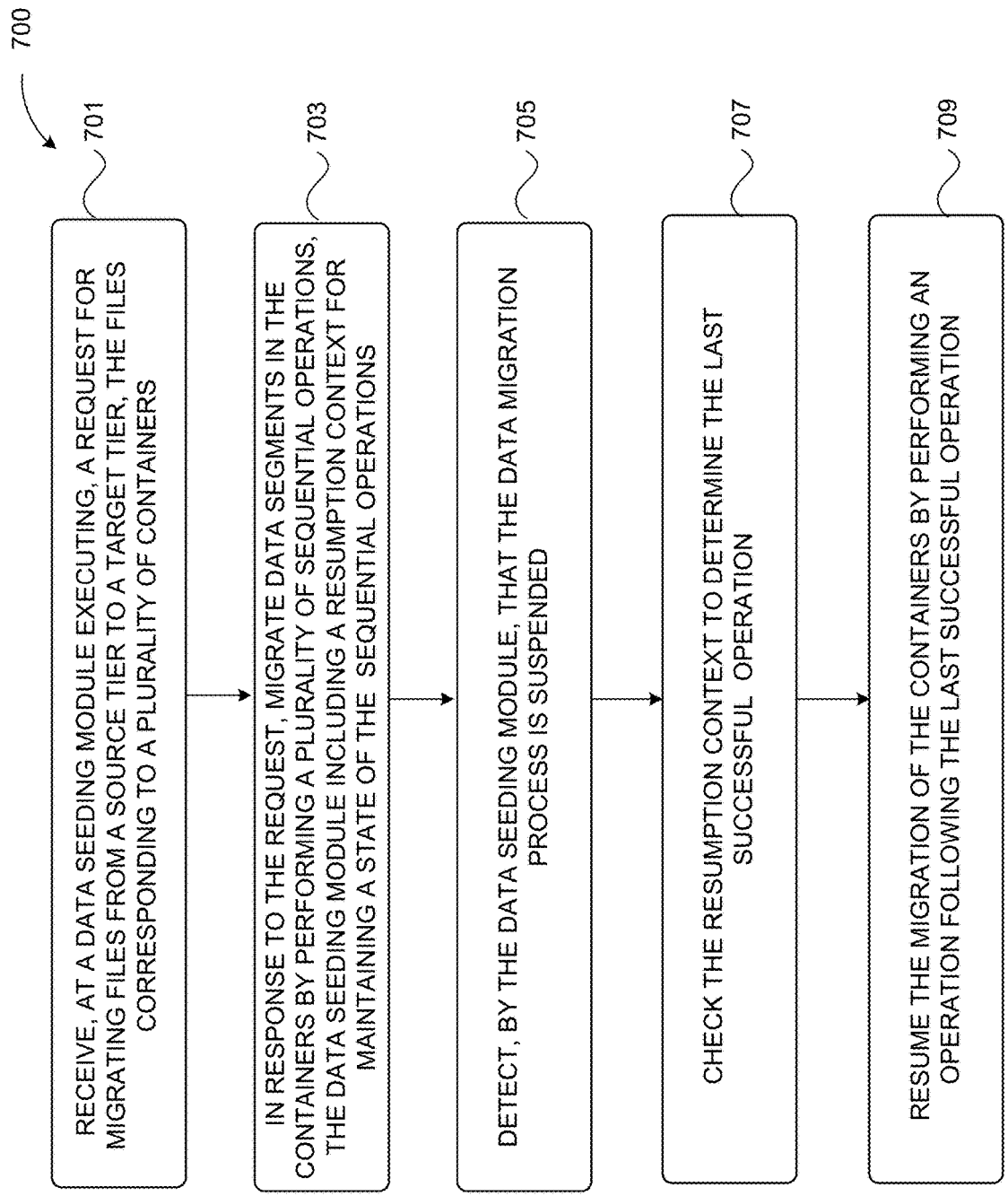
FIG. 7 is a flow diagram illustrating a process for data migration from a source to a target tier in accordance with an embodiment of the invention.

FIG. 7 is a flow diagram illustrating a process for data migration from a source tier to a target tier in accordance with an embodiment of the invention. Process 700 may be performed by processing logic which may include software, hardware, or a combination thereof. For example, process 700 may be performed by the data seeding module 121. Referring to FIG. 7, in operation 701, a request for migrating files from a source tier to a target tier is received at a data seeding module in the storage system. The files correspond to containers, each container with a container identifier. In operation 703, in response to the request, the data seeding module migrates data segments in the containers by performing sequential operations, where the data seeding module includes a resumption context for maintaining a state of the sequential operations, the state indicating a last successful operation of the sequential operations. In operation 705, the data seeding module detects that the data migration process is suspended. In operation 707, the data seeding module checks the resumption context to determine the last successful operation. In operation 709, the data seeding module resumes the data migration process by performing an operation following the last successful operation.

Data Integrity Validation

As described above, a physical/bulk data movement or seeding, is more efficient compared to a file-based data movement. Seeding is particularly useful when moving initial data sets from a source tier to a target tier that is relatively empty, where there is no possibility of de-duplicating data on the target tier; and when the data to be migrated have bad localities.

Figure 8:
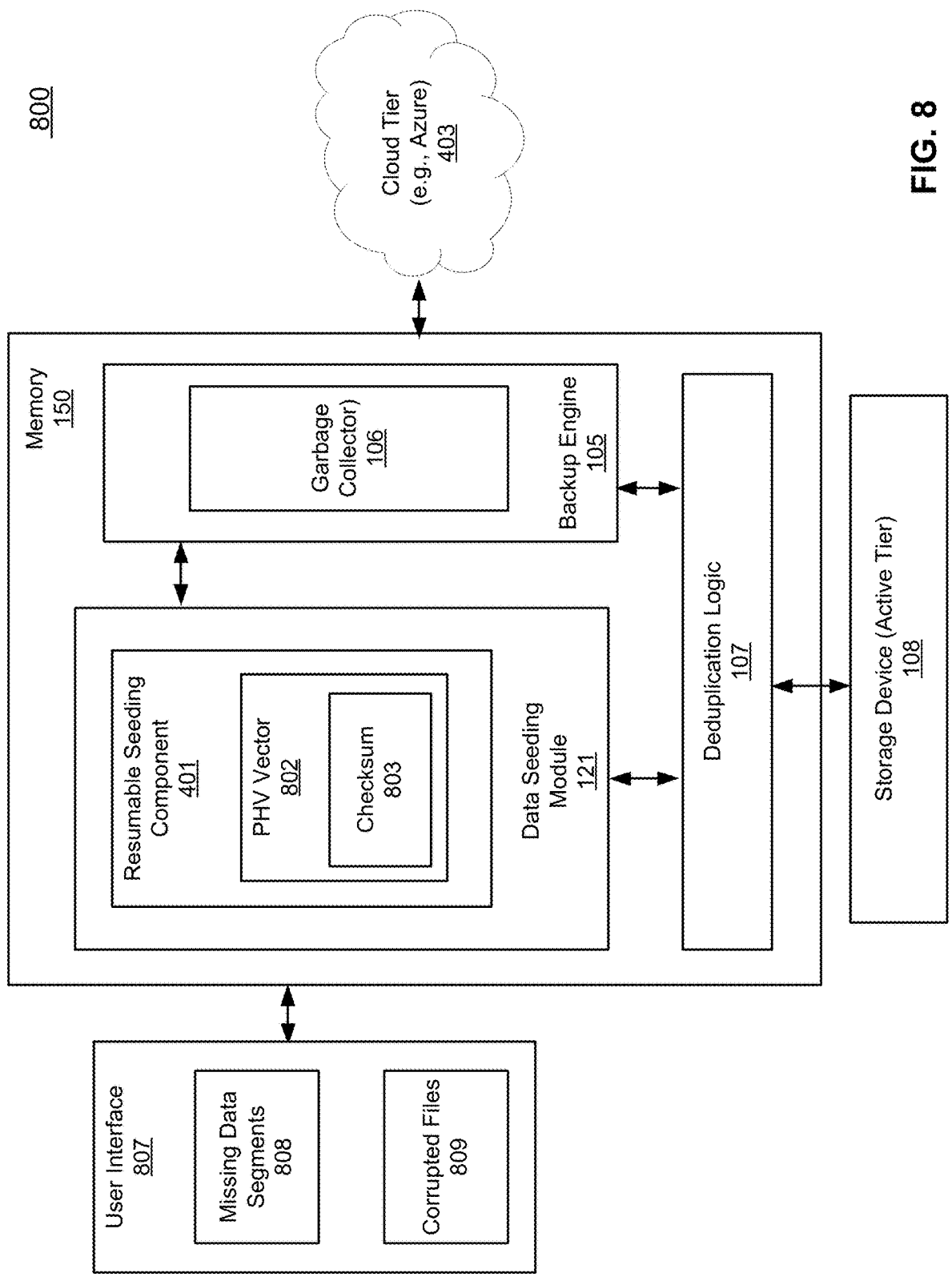
FIG. 8 illustrates a system for data integrity validation for use with a seeding process, in accordance with an embodiment.

FIG. 8 illustrates a system for data integrity validation for use with a seeding process, in accordance with an embodiment.

Referring to FIG. 8, the resumable seeding component 401 can execute a seeding algorithm to build a PHV vector and a PHF using data segment fingerprints from an index. The seeding algorithm can enumerate selected files for migration in the enumeration phase and populates the PHV vector with the data segment fingerprints belonging to the selected files. The seeding algorithm then can select containers corresponding to the selected files and copy data segments in the containers from a source tier to a target tier. During the copy phase, the seeding algorithm walks the containers, and searches the PHV vector for each fingerprint corresponding to each data segment in the selected containers. If a data segment is marked live in the PHV vector, the data segment is copied forward from the source tier to the target tier (i.e. the cloud tier 403) and the corresponding bit is reset in the PHV vector.

At the end of copy phase, if every data segment is copied successfully, there would be a zero XOR checksum in the PHV vector, since all bits would have been reset. However, the XOR checksum can be non-zero in the following two scenarios. First, if there is a data segment reference (e.g., fingerprint) populated in the PHV vector, but the actual data segment is missing from the containers on the source tier. In this case, during the copy phase, the data segment would not be able to be found in any container, and the corresponding bit would not be cleared in the PHV vector. Second, if there is a data segment reference populated in the PHV vector and the corresponding segment is also present in a container on the source tier; however, the data segment is not copied forward due to a bug in the seeding algorithm.

Once the seeding algorithm detects a non-zero XOR PHV checksum, it walks the set of containers again, to find the actual segment references or fingerprints corresponding to the bits that have not been reset in the PHV. Once the seeding algorithm identifies such a segment reference, it looks up the index to detect if the actual segment is present in any container. If the data segment is not found in the container set, then the data segment is marked as a missing data segment on the source tier, and a data corruption alert is sent to the user. If the data segment is found in the container set, the seeding algorithm would determine that the data segment is not copied to the target tier, and the seeding process would be aborted.

In an embodiment, if the seeding process is suspended due to various reasons, for example, preemption by a garbage collector or a DDFS/system crash. The resumable seeding component 401 can resume the seeding process by executing an operation immediately following the last successfully executed operation. The resumable seeding component 401 loads a whole PHV vector 802 from a disk into the memory 150, and walks containers corresponding to the files for migration to determine each data segment that has been copied to the cloud tier 403 in a previous run of the seeding process. For each data segment that has been successfully copied to the cloud tier, the resumable seeding component can reset a bit corresponding to a fingerprint for that data segment in the PHV vector, prior to starting the copy phase in the resumed run of the seeding process.

If the seeding process is not to be suspended again, and at the end of the copy phase, the resumable seeding component 401 can calculate a checksum of the PHV checksum. If the checksum is not zero, the resumable seeding component 401 can repeat the above operations again.

By using the resumable seeding component 401 which stores the PHV vector 802, information of reset bits in previous runs of the seeding process is kept, and can survive a system crash or other incidents that cause the seeding process to suspend or terminate.

The resumable seeding component 401 can detect data inconsistency and corruption on the source tier and the target tier, and can determine the existence of potential bugs in the seeding algorithm.

For example, if the seeding algorithm misses copying one or more data segments from the source tier 108 to the cloud tier 403, the resumable seeding component 401 can determine there is a bug in the seeding algorithm. The resumable seeding component 401 performs data integrity checks faster by using an in-memory PHV. This represents a performance improvement over data integrity checks with the file-based data movement, which verifies files logically using an on-disk index.

As further shown in FIG. 8, missing data segments 808 on the source tier 108 and corrupted files 809 corresponding to the missing data segments 808 can be reported to a user by displaying them on a user interface 807.

Figure 9:
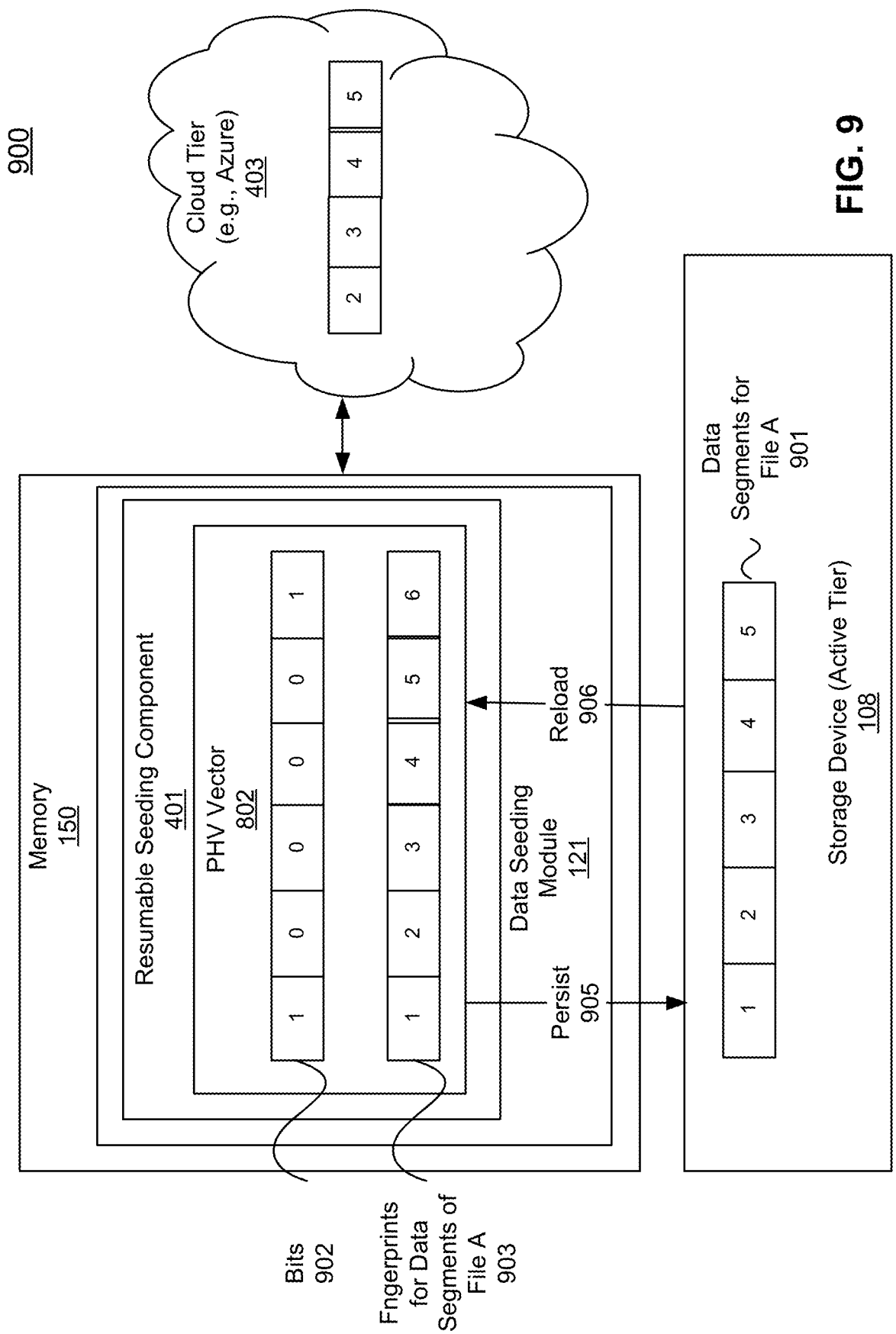
FIG. 9 illustrates an example of data integrity validation, in accordance with an embodiment.

FIG. 9 illustrates an example of data integrity validation, in accordance with an embodiment. As shown in FIG. 9, file A can correspond to a number of data segments for file A 901 that are stored in a number of containers (not shown). These containers can also include data segments from other files stored on the active tier 108.

In an embodiment, the PHV vector 802 includes references (fingerprints) for all data segments for the files that have been selected for migration from the active 109 to the cloud tier 403. Although FIG. 9 shows data segments for only one file (i.e., File A), data segments of multiple files can be represented by the PHV vector 802, The PHV vector 802 further includes corresponding bits for fingerprints of data segments of the selected files. For example, bits 902 can correspond to fingerprints for data segments of file A 903. The PHV 802 can be persisted 905 to a disk in the active tier 108 or another tier. When the seeding process is resumed after being suspended, the resumable seeding component 401 can load 906 the PHV vector into the memory 150, and reset a bit to each data segment that has been copied to the cloud tier 403.

In an embodiment, a file containing identifiers for all containers corresponding to the files selected for migration is also persisted to the disk in the active tier 108. Upon resumption of the seeding process, the resumable seeding component 401 can load the file into the memory, and walk the containers corresponding to the container identifiers (container Ids) in the file. The containers Ids and the PHV vector 802 can provide information for the resumable seeding component 401 to determine which data segments for file A have been successfully copied to the cloud tier 402.

In this example, as shown in FIG. 9, the resumable seeding component 401 can determine that data segments 2, 3, 4, and 5 have been copied in a previous run of the seeding process, and can reset the corresponding bits to the data segments to zero prior to starting the copy phase in the resumed run.

In an embodiment, the resumable seeding component 401 can keep track of which data segments have been copied to the target tier in a number of ways. When the seeding process is running, if no other process is writing to the target tier, the resumable seeding component can persist a highest container Id to the target tier before the seeding process starts the copying. When the seeding process is resumed after being suspended, the seeding process can walk containers from the persisted highest container Id to the latest container Id on the target tier. In an embodiment, all data segments that are in the walked containers and that correspond to the data to be moved from the source tier to the target tier can be considered to have been copied to the target tier.

In an alternative embodiment, if one or more other processes are also writing to the target tier, the resumable seeding component can track the containers written by the seeding process by persisting the beginning container Id, and walk all the containers from the persisted container Id to the latest container-id with seeding bit set on the containers and reset the bits in the PHV vector.

If after the completion of the copy phase in the resumed run, the XOR checksum of the bits 902 is not zero, as shown in FIG. 9. The resumable seeding component 401 can walk the containers corresponding to File A again, to find the actual segment references or fingerprints corresponding to bits that have not been set from the bits set 902 in the PHV, and looks up an index to detect if an actual segment corresponding to a non-zero bit is present in any container.

As shown in FIG. 9, the bit corresponding to data segment 6 is not reset to zero, and the data segment is not found in any container in the active tier. The resumable seeding component 401 can determine that data segment 6 is missing from the source tier/active tier 108, and that file A is corrupted.

In an alternative embodiment, if the data segment (e.g., data segment 1) corresponding to a non-zero bit is found in the container set, the resumable seeding component 401 can determine that the data segment is not copied to the target tier, and the seeding process would be aborted. In this case, there may be a bug in an seeding algorithm used by the seeding process.

Figure 10:
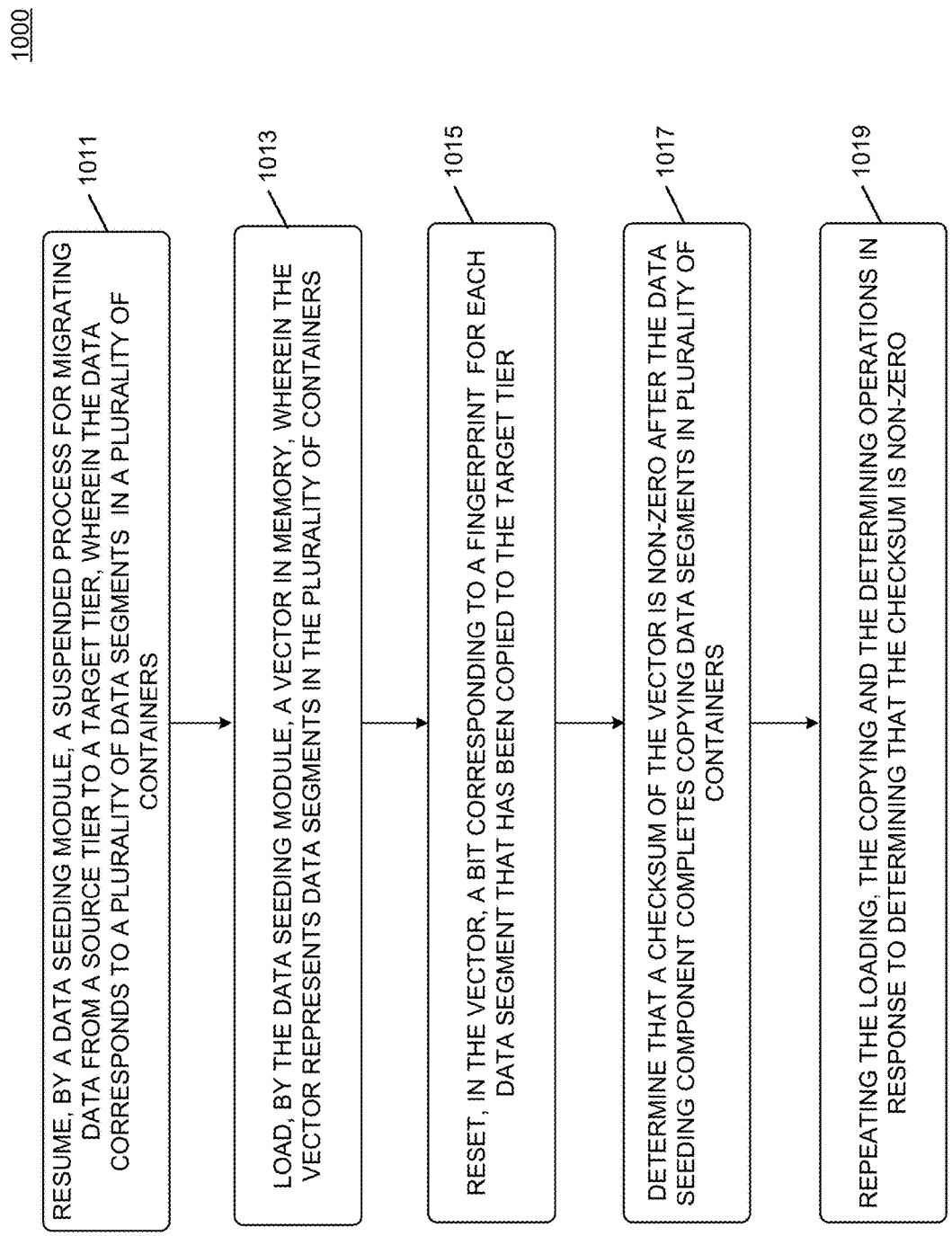
FIG. 10 illustrates a process of data integrity validation for use with a seeding process, in accordance with an embodiment.

FIG. 10 illustrates a process of data integrity validation for use with a seeding process, in accordance with an embodiment. Process 1000 may be performed by processing logic which may include software, hardware, or a combination thereof. For example, process 700 may be performed by the data seeding module 121. Referring to FIG. 7, in operation 1011, a data seeding module resumes a suspended process for migrating data from a source tier to a target tier, wherein the data corresponds to data segments in containers. In operation 1013, the data seeding module loads a vector in memory, wherein the vector is a perfect function vector and represents data segments in containers. In operation 1015, the data seeding module resets a bit in the vector, where the bit corresponds to a fingerprint for each data segment that has been copied to the target tier. In operation 1017, the data seeding module calculates a checksum of the vector after the data seeding module completes copying data segments in the containers. A non-zero checksum of the PHV indicates that one or more data segments are missing on the source tier or the data segments are not successfully copied to the target tier. In operation 1019, the data seeding module repeats the loading, the copying and the determining operations in response to determining that the checksum is non-zero.

Figure 11:
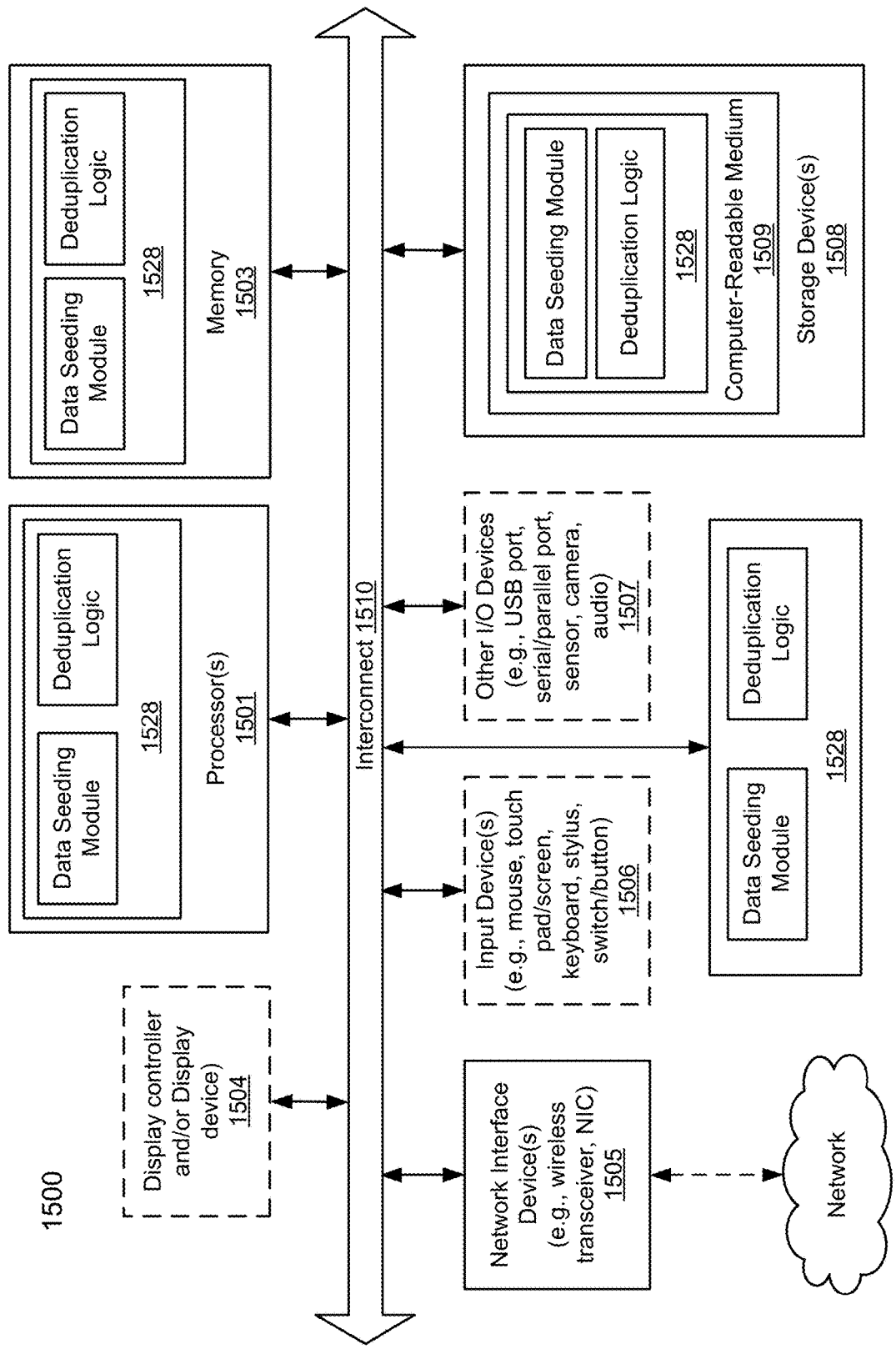
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting and reporting data inconsistency in a storage system, the method comprising:
   resuming, by a data seeding module, a suspended process for migrating data from a source tier to a target tier, wherein the data corresponds to a plurality of data segments in a plurality of containers;
   loading, by the data seeding module, a vector in memory, wherein the vector represents data segments in the plurality of containers;
   resetting, in the vector, a bit corresponding to a fingerprint for each data segment that has been copied to the target tier;
   determining that a checksum of the vector is non-zero after the data seeding module completes copying data segments in plurality of containers; and
   repeating the loading, the copying and the determining operations in response to determining that the checksum is non-zero.

2. The method of claim 1, wherein the vector is a perfect hash vector (PHV), which includes a fingerprint for each segment associated with the data to be migrated.

3. The method of claim 2, wherein the non-zero checksum of the PHV indicates that a data segment that is missing on the source tier is populated in the vector, or that the data segment that is present on the source tier and populated in the vector is not copied to the target tier.

4. The method of claim 3, further comprising:
   reporting the data segment that is missing either on the source tier or the target tier to a user via a user interface.

5. The method of claim 4, wherein a file associated with the missing segment is identified and reported to the user.

6. The method of claim 1, wherein the source tier is an active tier and the target tier is a cloud tier.

7. The method of claim 1, wherein the vector is persisted into a disk when the process for migrating the data is suspended, either independently or as part of a resumption context.

8. A non-transitory machine-readable medium having instructions stored therein, which when executed by a processor, cause the processor to perform operations comprising:
   resuming, by a data seeding module, a suspended process for migrating data from a source tier to a target tier, wherein the data corresponds to a plurality of data segments in a plurality of containers;
   loading, by the data seeding module, a vector in memory, wherein the vector represents data segments in the plurality of containers;
   resetting, in the vector, a bit corresponding to a fingerprint for each data segment that has been copied to the target tier;
   determining that a checksum of the vector is non-zero after the data seeding module completes copying data segments in plurality of containers; and
   repeating the loading, the copying and the determining operations in response to determining that the checksum is non-zero.

9. The non-transitory machine-readable medium of claim 8, wherein the vector is a perfect hash vector (PHV), which includes a fingerprint for each segment associated with the data to be migrated.

10. The non-transitory machine-readable medium of claim 9, wherein the non-zero checksum of the PHV indicates that a data segment that is missing on the source tier is populated in the vector, or that the data segment that is present on the source tier and populated in the vector is not copied to the target tier.

11. The non-transitory machine-readable medium of claim 10, wherein the operations further comprise:
reporting the data segment that is missing either on the source tier or the target tier to a user via a user interface.

12. The non-transitory machine-readable medium of claim 11, wherein a file associated with the missing segment is identified and reported to the user.

13. The non-transitory machine-readable medium of claim 8, wherein the source tier is an active tier and the target tier is a cloud tier.

14. The non-transitory machine-readable medium of claim 8, wherein the vector is persisted into a disk when the process for migrating the data is suspended, either independently or as part of a resumption context.

15. A data processing system, comprising:
a processor;
a memory coupled to the processor to store instructions, which when executed by the processor, cause the processor to perform operations, the operations comprising:
resuming, by a data seeding module, a suspended process for migrating data from a source tier to a target tier, wherein the data corresponds to a plurality of data segments in a plurality of containers;
loading, by the data seeding module, a vector in memory, wherein the vector represents data segments in the plurality of containers;
resetting, in the vector, a bit corresponding to a fingerprint for each data segment that has been copied to the target tier;
determining that a checksum of the vector is non-zero after the data seeding module completes copying data segments in plurality of containers; and
repeating the loading, the copying and the determining operations in response to determining that the checksum is non-zero.

16. The system of claim 15, wherein the vector is a perfect hash vector (PHV), which includes a fingerprint for each segment associated with the data to be migrated.

17. The system of claim 16, wherein the non-zero checksum of the PHV indicates that a data segment that is missing on the source tier is populated in the vector, or that the data segment that is present on the source tier and populated in the vector is not copied to the target tier.

18. The system of claim 17, wherein the operations further comprise:
reporting the data segment that is missing either on the source tier or the target tier to a user via a user interface.

19. The system of claim 18, wherein a file associated with the missing segment is identified and reported to the user.

20. The system of claim 15, wherein the vector is persisted into a disk when the process for migrating the data is suspended, either independently or as part of a resumption context.

* * * * *